United States Patent
Mokadem et al.

(10) Patent No.: US 9,044,825 B2
(45) Date of Patent: Jun. 2, 2015

(54) METHOD FOR WELDING DEPENDING ON A PREFERRED DIRECTION OF THE SUBSTRATE

(75) Inventors: Selim Mokadem, Düsseldorf (DE); Norbert Pirch, Aachen (DE)

(73) Assignees: SIEMENS AKTIENGESELLSCHAFT, Munich (DE); FRAUNHOFER GESELLSCHAFT ZUR FÖRDERUNG DER ANGEWANDTEN FORSCHUNGE E. V., München (DE)

( * ) Notice: Subject to any disclaimer, the term of this patent is extended or adjusted under 35 U.S.C. 154(b) by 195 days.

(21) Appl. No.: 12/937,591

(22) PCT Filed: Apr. 9, 2009

(86) PCT No.: PCT/EP2009/054306
§ 371 (c)(1),
(2), (4) Date: Oct. 13, 2010

(87) PCT Pub. No.: WO2009/144077
PCT Pub. Date: Dec. 3, 2009

(65) Prior Publication Data
US 2011/0031226 A1 Feb. 10, 2011

(30) Foreign Application Priority Data

Apr. 14, 2008 (DE) .......................... 10 2008 018 708

(51) Int. Cl.
*B23K 26/00* (2014.01)
*B23K 26/08* (2014.01)
*B23K 26/32* (2014.01)
*B23K 26/34* (2014.01)
*C22C 19/05* (2006.01)
*C22C 19/07* (2006.01)
*B23P 6/00* (2006.01)

(52) U.S. Cl.
CPC ........... *B23K 26/08* (2013.01); *B23K 2201/001* (2013.01); *B23K 26/3206* (2013.01); *B23K 26/3213* (2013.01); *B23K 26/345* (2013.01); *C22C 19/055* (2013.01); *C22C 19/056* (2013.01); *C22C 19/057* (2013.01); *C22C 19/07* (2013.01); *B23P 6/007* (2013.01)

(58) Field of Classification Search
USPC ............... 219/121.6–121.66, 121.78, 121.16; 29/889, 889.1
See application file for complete search history.

(56) References Cited

U.S. PATENT DOCUMENTS

| | | | | |
|---|---|---|---|---|
| 4,015,100 A | * | 3/1977 | Gnanamuthu et al. | 148/512 |
| 4,122,240 A | * | 10/1978 | Banas et al. | 428/655 |
| 4,830,265 A | * | 5/1989 | Kennedy et al. | 228/203 |

(Continued)

FOREIGN PATENT DOCUMENTS

| | | |
|---|---|---|
| CN | 1382317 A | 11/2002 |
| CN | 1541790 A | 11/2004 |

(Continued)

*Primary Examiner* — Sang Y Paik (57) ABSTRACT

Welding repairs are often carried out on directionally solidified components that nevertheless do not possess the desired crystallographic surface alignment, which reduces mechanical strength. The method provided selects the direction of travel depending on the crystallographically preferred direction of the substrate such that no more misorientations occur. A laser beam may be used for remelting.

10 Claims, 6 Drawing Sheets

(56) References Cited

U.S. PATENT DOCUMENTS

| | | | |
|---|---|---|---|
| 5,142,778 A * | 9/1992 | Smolinski et al. | 29/889.1 |
| 5,900,170 A * | 5/1999 | Marcin et al. | 219/121.66 |
| 6,024,792 A * | 2/2000 | Kurz et al. | 117/9 |
| 6,489,584 B1 * | 12/2002 | Kelly | 219/121.46 |
| 6,972,390 B2 * | 12/2005 | Hu et al. | 219/121.64 |
| 2002/0166844 A1 | 11/2002 | Kelly | |
| 2005/0194363 A1 | 9/2005 | Hehmann | |
| 2006/0054079 A1 | 3/2006 | Schlienger | |

FOREIGN PATENT DOCUMENTS

| | | |
|---|---|---|
| EP | 0 486 489 B1 | 11/1994 |
| EP | 0 412 397 B1 | 3/1998 |
| EP | 0 892 090 A1 | 1/1999 |
| EP | 0 786 017 B1 | 3/1999 |
| EP | 1 306 454 A1 | 5/2003 |
| EP | 1 319 729 A1 | 6/2003 |
| EP | 1 348 781 A1 | 10/2003 |
| EP | 1348781 A1 | 10/2003 |
| EP | 1 204 776 B1 | 6/2004 |
| EP | 1 561 536 A1 | 8/2005 |
| EP | 1561536 A1 | 8/2005 |
| EP | 1835040 A1 | 9/2007 |
| WO | WO 99/67435 A1 | 12/1999 |
| WO | WO 00/44949 A1 | 8/2000 |
| WO | WO 2008/098614 A1 | 8/2008 |

\* cited by examiner

| Material | C | Cr | Ni | Co | Mo | W | Ta | Nb | Al | Ti | B | Zr | Hf |
|---|---|---|---|---|---|---|---|---|---|---|---|---|---|
| Ni-based investment casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | 1.00 |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | 0.10 |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | |
| CMSX-6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

Chemical composition in %

METHOD FOR WELDING DEPENDING ON A PREFERRED DIRECTION OF THE SUBSTRATE

CROSS REFERENCE TO RELATED APPLICATIONS

This application is the US National Stage of International Application No. PCT/EP2009/054306, filed Apr. 9, 2009 and claims the benefit thereof. The International Application claims the benefits of German application No. 10 2008 018 708.9 DE filed Apr. 14, 2008. All of the applications are incorporated by reference herein in their entirety.

FIELD OF INVENTION

The invention relates to a process for welding a substrate having a preferred direction.

BACKGROUND OF INVENTION

Welding is a repair process which is frequently used to close cracks or to apply material. In this case, a laser is often used as the energy source. The laser welding process is also used to repair directionally solidified components, for example turbine blades or vanes of the largest gas turbines, after they have been used, which possibly have cracks as a result of extraordinarily severe loading. These can be components with grains solidified in columnar form (DS) or else single crystals (SX).

The component therefore has a defined preferred crystallographic direction in the crystal structure. The solidification behavior of the material, which should obtain the same orientation as the substrate during the laser welding, depends on the composition of the alloy, the temperature gradient and the solidification rate. For a defined alloy, there are graphs showing how the structure developed depending on the temperature gradient and the solidification rate.

Nevertheless, grains frequently grow in an undesirable direction.

SUMMARY OF INVENTION

It is therefore an object of the invention to overcome this problem.

The object is achieved by a process as claimed in the claims.

The dependent claims list further advantageous measures which can be combined with one another, as desired, in order to obtain further advantages.

The figures and the description represent only exemplary embodiments of the invention.

DETAILED DESCRIPTION OF INVENTION

Figure 1:
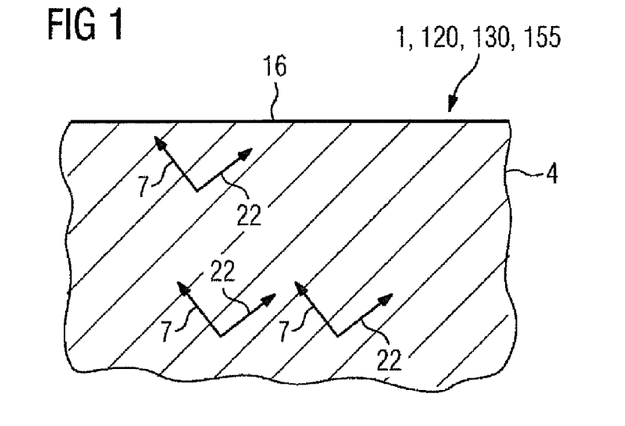
FIGS. 1-6 show a substrate during laser remelting.
Figure 9:
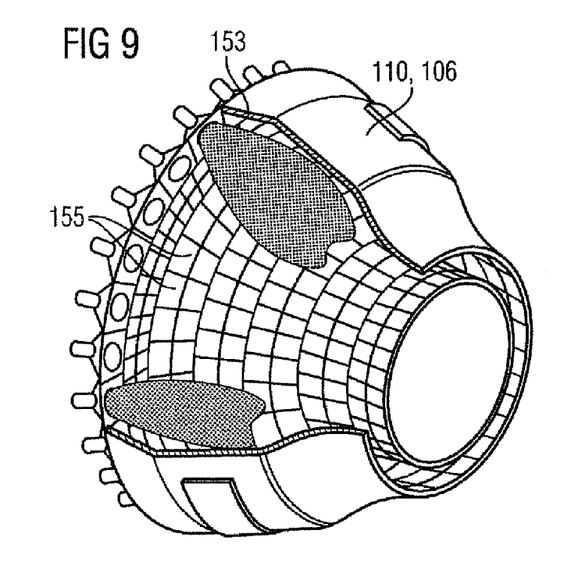
FIG. 9 shows a perspective view of a combustion chamber.
Figure 10:
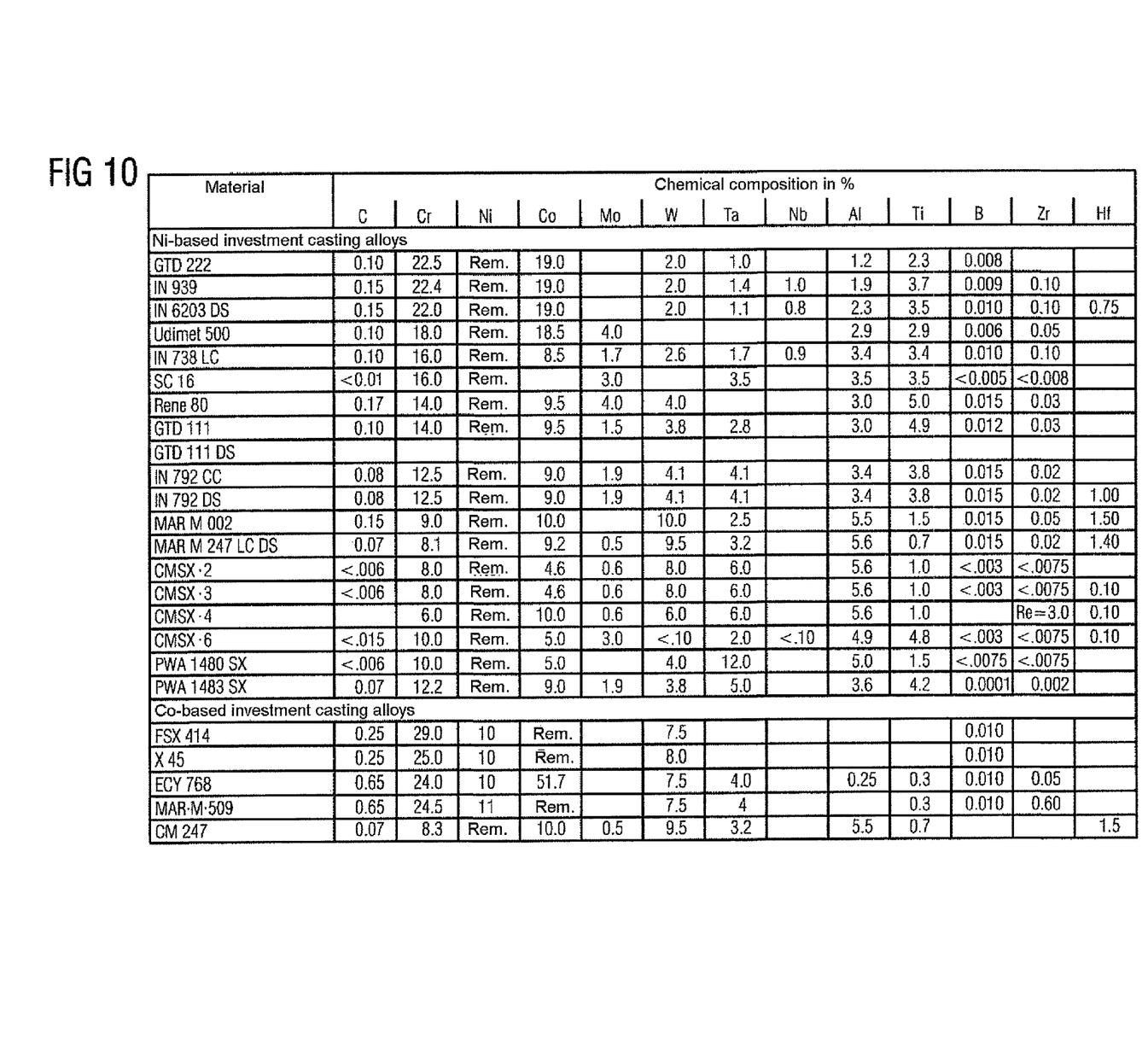
FIG. 10 shows a list of superalloys.

FIG. 1 is a cross-sectional view of a component 1, 120, 130 (FIGS. 8, 10), 155 (FIG. 9) having a substrate 4 which, in particular in the case of turbine blades or vanes for gas turbines 100 (FIG. 7) or steam turbines, has a superalloy according to FIG. 10.

The substrate 4 has a directionally solidified structure, i.e. it can consist of columnar grains solidified in columnar form (DS) or of a single crystal (SX). The arrows 7, 22 indicate the preferred crystallographic directions of the substrate 4, i.e. of the single crystal or of the columnar grains (e.g.: [001]=7, [010]=22).

The substrate 4 has a crack (not shown). The substrate 4 is therefore melted (remelted) in the region of the crack, where the molten region (melt 19, FIGS. 3, 4) should again solidify directionally in a DS or SX structure.

The substrate 4 may likewise have a point (excessively thin wall, not shown) which is to be strengthened by build-up welding (i.e. the supply of material is required), in particular laser build-up welding.

Figure 2:
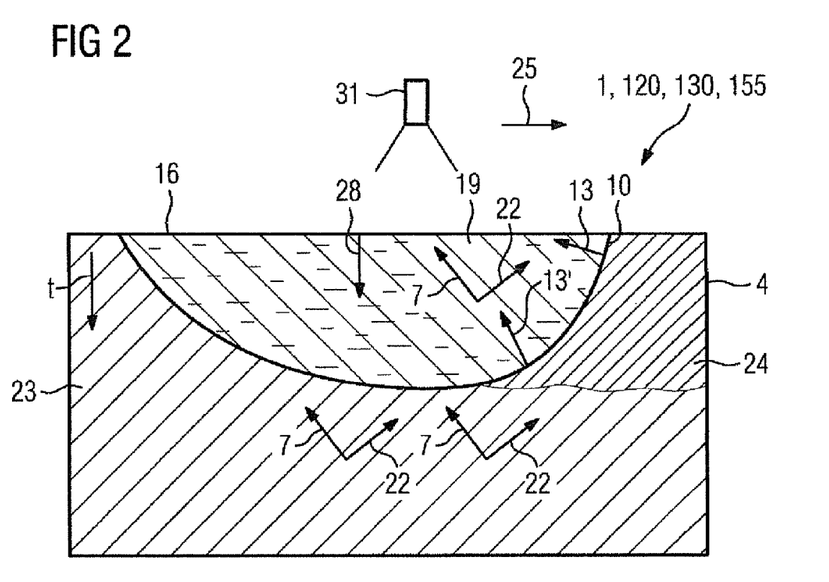

FIG. 2 shows a line 10 of a solidification front, which represents a surface and, in the plane of the drawing, shows a transition between a melt 19 and the zone 24 which has already solidified from a melt and also a region 23 still to be remelted.

In the figures, the line 10 always shows only a section of the solidification front.

The substrate 4 moves along a direction 25 from left to right in the drawing, such that the solidification front 10 propagates from right to left in the drawing counter to the direction 25.

It is likewise possible for only the welding appliance 31 to move instead of the substrate 4.

The solidification front 10 is then that part of the elliptical line 10, on the right in FIG. 2, which comprises the melt 19. The line 10 is only exemplary. The line 10 may also have other forms.

Depending on the depth t along the direction 28 (perpendicular downward to the surface 16) of the line 10, there are differently oriented temperature gradients 13, 13', depending on the vicinity of the surface 16 of the substrate 4. Here, the temperature gradient 13, 13' is virtually perpendicular on the solidification front 10.

Figure 3:
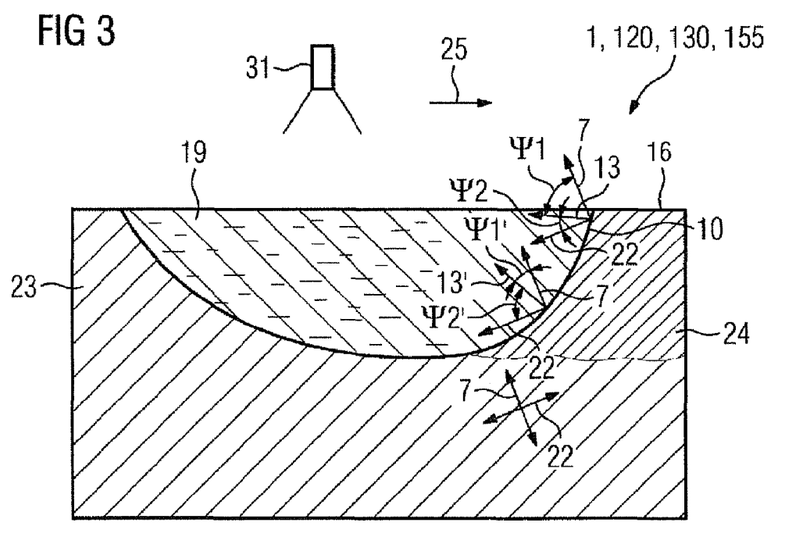

Proceeding from FIG. 2, angles $\Psi 1, \Psi 1'$ and $\Psi 2, \Psi 2'$ are then additionally shown in FIG. 3 (and also in FIG. 4), where $\Psi 1, \Psi 1'$ are the angles between the preferred direction 7 and the temperature gradients 13, 13' and $\Psi 2, \Psi 2'$ are the angles between the temperature gradients 13, 13' and a second crystallographic direction 22 (perpendicular to the preferred direction 7).

Here, the substrate 4 moves from left to right in the drawing.

In FIG. 3, the direction of dendrite growth is changed during growth from the melt 19, since $\Psi 2 < \Psi 1$ holds true at the surface 16, such that the crystallographic direction 22 directed downward from the surface 16 is energetically promoted, and the dendrites grow in a second crystallographic direction 22 from the surface 16, such that secondary grains form in the region of the surface.

At a greater depth, it may hold true that $\Psi 2' > \Psi 1'$ and the direction 7 is preferred.

The problem first arises when a direction of dendrite growth directed from the surface 16 into the melt 19 is favored at the surface 16. By definition, epitaxial growth from the surface 16 is not possible, because a substrate which can act as a nucleus for the dendrites is not present there. Instead, the progression of the solid/liquid phase boundary at the surface 16 is realized under these conditions via the formation of secondary arms, tertiary arms, etc. This is too slow compared to the rate of growth of the nuclei before the solidification front. At some point in time, one of these nuclei prevails with respect to the epitaxially grown dendrites, and directions of dendrite growth which are not correlated with those in the substrate 4 are formed.

The problem of epitaxy loss therefore always arises whenever the crystal directions 7, 22 favored at the surface 16 are not oriented parallel to the surface 16. These crystal directions 7, 22, favored for the dendrite growth, are independent of the direction of movement 25. However, these crystal directions can be utilized by the dendrites for their growth in two directions.

Figure 5:
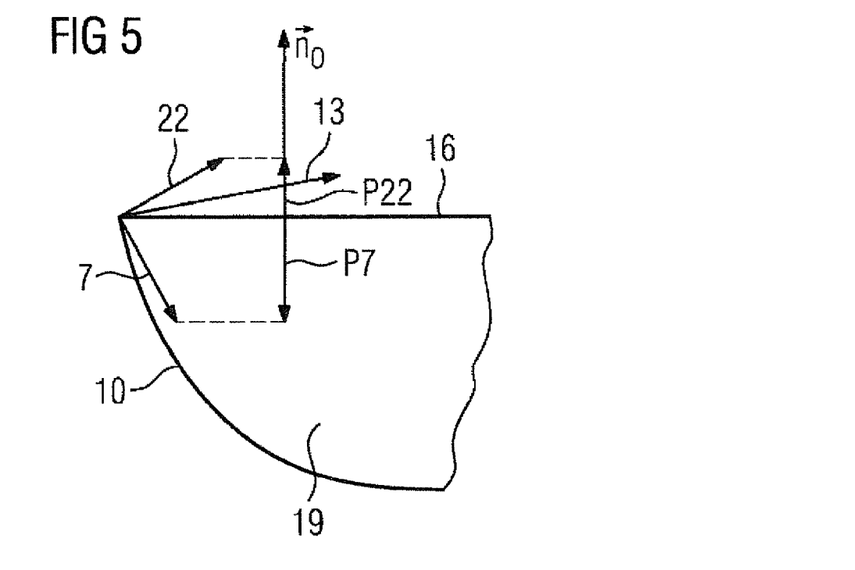

In order to avoid epitaxy loss, the direction of movement 25 has to be selected in such a manner that of the crystal directions 7, 22 (here 22) favored at the surface 16 on the solidification front 10, a direction of dendrite growth which has a projection (vectors P22, P7=projections of 7, 22 to surface normal $\vec{n}_0$) in the direction of the surface normal $\vec{n}_0$ (FIG. 5) is initialized.

Figure 4:
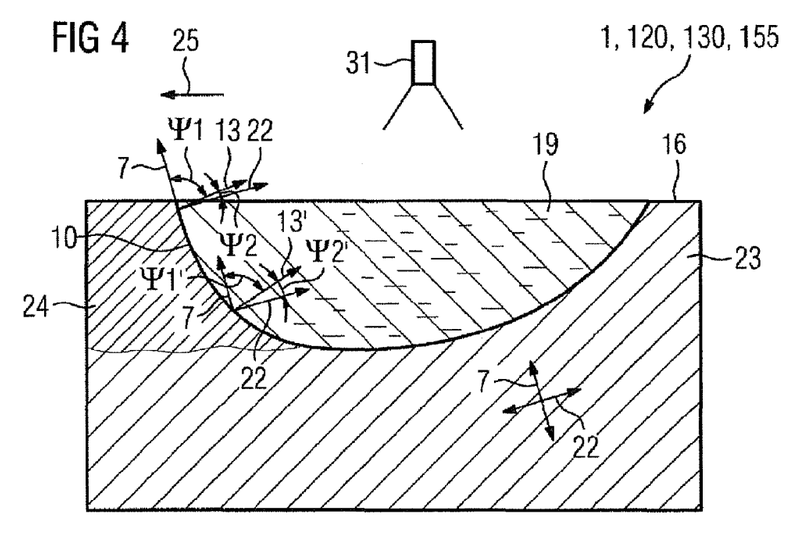

By selecting the direction of movement 25 in FIG. 4, specifically from right to left in the drawing, that crystallographic direction, here 22, which is not directed downward from the surface 16 is preferred.

This applies with preference to the entire solidification front 10, i.e. the line 10 between the melt pool 19 and the region 24 which has already solidified.

Figure 6:
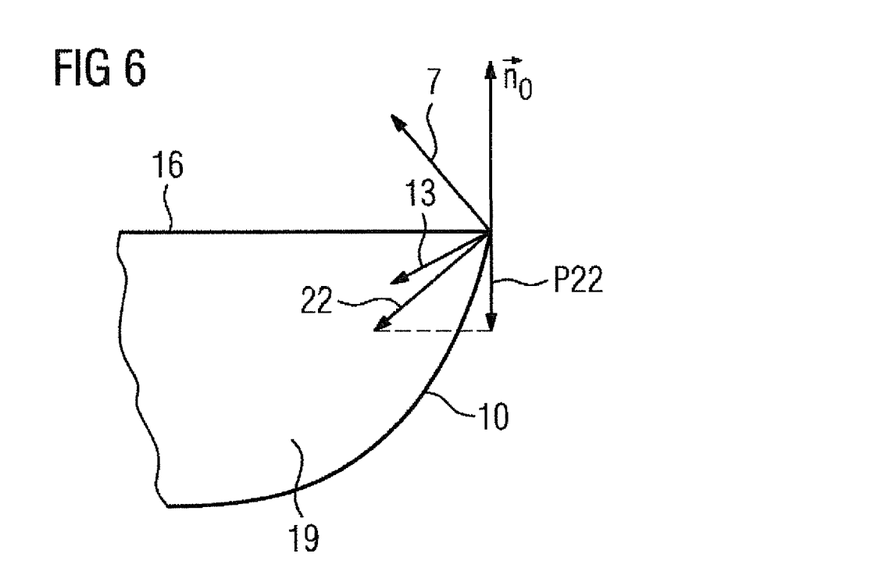

Both of the crystallographic directions 7, 22 are permissible and desirable. This actually involves the loss of epitaxial growth, which has the effect that the crystal orientation is lost completely in the weld metal (FIG. 6: vector P22 opposed to $\vec{n}_0$=FIG. 3). This can be avoided by preventing the promotion of a direction of dendrite growth directed downward from the surface 16.

Figure 7:
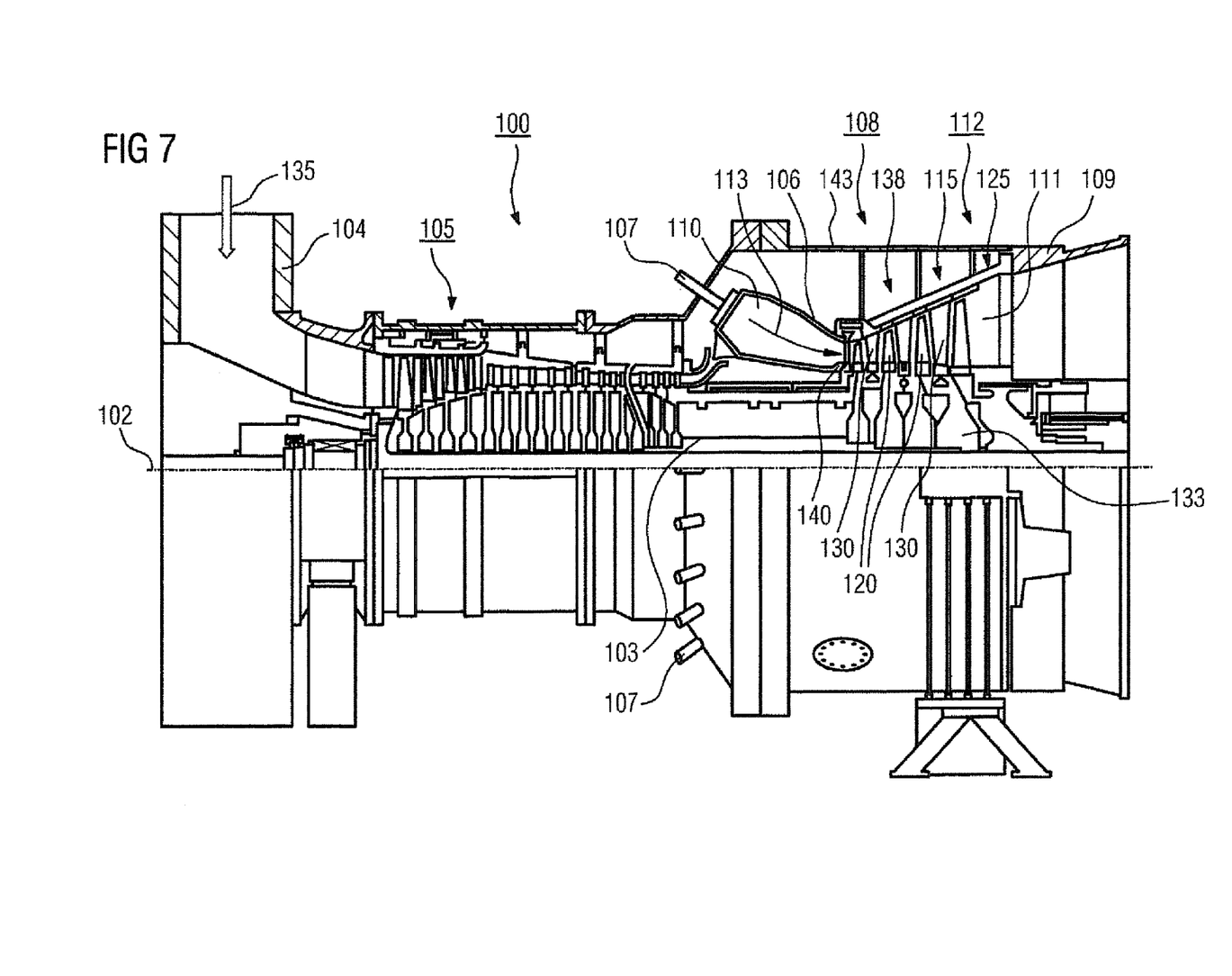
FIG. 7 shows a gas turbine.

FIG. 7 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The blades or vanes 120, 130 may likewise have coatings protecting against corrosion (MCrAlX; M is at least one element selected from the group consisting of iron (Fe), cobalt (Co), nickel (Ni), X is an active element and stands for yttrium (Y) and/or silicon, scandium (Sc) and/or at least one rare earth element, or hafnium). Alloys of this type are known from EP 0 486 489 B1, EP 0 786 017 B1, EP 0 412 397 B1 or EP 1 306 454 A1.

It is also possible for a thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 8:
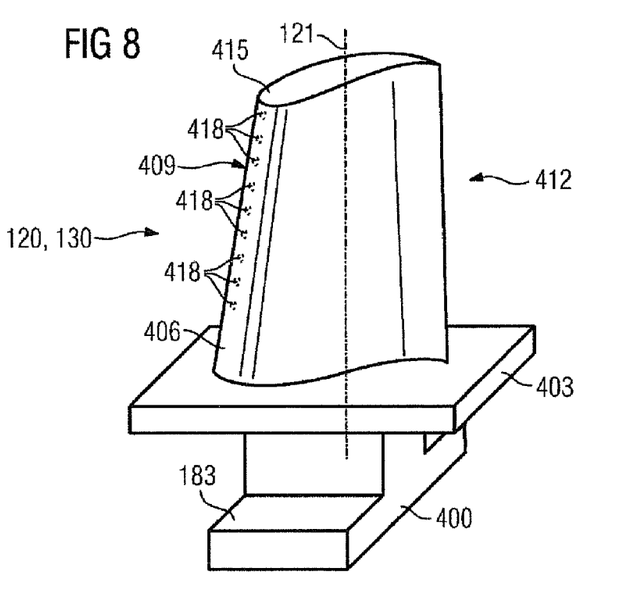
FIG. 8 shows a perspective view of a turbine blade or vane.

FIG. 8 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024, 792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

FIG. 9 shows a combustion chamber 110 of a gas turbine. The combustion chamber 110 is configured, for example, as what is known as an annular combustion chamber, in which a multiplicity of burners 107, which generate flames 156, arranged circumferentially around an axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that after they have been used, protective layers may have to be removed from heat shield elements 155 (e.g. by sand-blasting). Then, the corrosion and/or oxidation layers and products are removed. If appropriate, cracks in the heat shield element 155 are also repaired. This is followed by recoating of the heat shield elements 155, after which the heat shield elements 155 can be reused.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

The invention claimed is:

1. A method for welding a directionally solidified component, comprising:
    moving an energy source or a substrate with respect to the other of the energy source or the substrate along a direction of movement, wherein the substrate comprises grains solidified in a columnar form or a single-crystal form;
    melting the substrate with the energy source to form a melt along the direction of movement, wherein the melting produces a solidification front between the melt and a solidified region of a melt, and wherein the melt includes a temperature gradient on the solidification front;
    defining a first angle between a first preferred crystallographic direction of dendritic growth of the substrate and the temperature gradient on the solidification front;
    defining a second angle between the temperature gradient and a second preferred crystallographic direction of dendritic growth on the solidification front; and
    resolidifying the melted substrate directionally in the columnar form or the single-crystal form in the second preferred crystallographic direction of dendritic growth of the substrate;
    wherein the direction of movement of the substrate or the energy source is selected such that the second preferred crystallographic direction of dendritic growth is directed parallel to a surface of the substrate.

2. The method as claimed in claim 1, wherein the energy source is moved with respect to the substrate.

3. The method as claimed in claim 1 wherein the substrate is moved with respect to the energy source.

4. The method as claimed in claim 1, wherein the energy source comprises a laser beam.

5. The method as claimed in claim 1, wherein the second preferred crystallographic direction is not directed downward from the surface over the entire solidification front.

6. A method for welding a directionally solidified component, comprising:
    providing a substrate comprising a surface grains solidified in a columnar form or a single-crystal form;
    melting the substrate along a direction of movement so as to form a solidification front at an interface between a melt and a solidified region of a melt, wherein the direction of movement is selected such that a direction of dendrite growth is initialized in a direction parallel to the surface; and
    resolidifying the melted substrate directionally in the columnar form or the single-crystal form.

7. The method as claimed in claim 6, wherein the energy source is moved with respect to the substrate.

8. The method as claimed in claim 6, wherein the substrate is moved with respect to the energy source.

9. The method as claimed in claim 6, wherein the energy source comprises a laser beam.

10. The method as claimed in claim 6, wherein the direction of dendrite growth is not directed downward from the surface over the entire solidification front.

* * * * *